US008031936B2

(12) United States Patent
Dempski et al.

(10) Patent No.: US 8,031,936 B2
(45) Date of Patent: Oct. 4, 2011

(54) IMAGE PROCESSING SYSTEM FOR SKIN DETECTION AND LOCALIZATION

(75) Inventors: Kelly L. Dempski, Evanston, IL (US); Manoj Seshadrinathan, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 1248 days.

(21) Appl. No.: 11/385,278

(22) Filed: Mar. 20, 2006

(65) Prior Publication Data
US 2007/0217690 A1 Sep. 20, 2007

(51) Int. Cl.
*G06K 9/00* (2006.01)

(52) U.S. Cl. ........ 382/165; 382/100; 382/118; 382/164; 382/190; 382/194; 382/224; 382/228; 382/325; 345/501; 345/581

(58) Field of Classification Search .................. 382/100, 382/103, 115, 118, 128, 162–167, 173, 181, 382/190, 194, 224–228, 325
See application file for complete search history.

(56) References Cited

U.S. PATENT DOCUMENTS

| | | | | |
|---|---|---|---|---|
| 5,130,935 | A * | 7/1992 | Takiguchi | 382/167 |
| 6,343,141 | B1 * | 1/2002 | Okada et al. | 382/118 |
| 6,845,181 | B2 * | 1/2005 | Dupin et al. | 382/274 |
| 6,891,533 | B1 * | 5/2005 | Alcorn et al. | 345/419 |
| 6,952,206 | B1 * | 10/2005 | Craighead | 345/422 |
| 7,035,456 | B2 * | 4/2006 | Lestideau | 382/164 |
| 7,038,685 | B1 * | 5/2006 | Lindholm | 345/501 |
| 7,218,759 | B1 * | 5/2007 | Ho et al. | 382/118 |
| 7,236,629 | B2 * | 6/2007 | Cooper et al. | 382/171 |
| 2003/0011612 | A1 * | 1/2003 | Luo et al. | 345/589 |
| 2003/0041173 | A1 * | 2/2003 | Hoyle | 709/248 |

OTHER PUBLICATIONS

Hualu Wang, Shih-Fu Chang, "A Highly Efficient System for Automatic Face Region Detection in MPEG Video", IEEE Transactions for Circuits and Systems in Video Technology, vol. 7, No. 4, Aug. 1997, pgs. 615-628.*
Hamed Fatemi, Hammed Ebrahimmalek, Richard Kleihorst, Henk Corporaal and Pieter Jonker, "Real-Time Face Recognition on a Mixed SIMD VLIW Architecture", in Progress 2003, 4th seminar on embedded systems, Proceedings, Oct. 22, 2003, pp. 1-6.*
Hamed Fatemi et al. "Real-Time Recognition on a Mixed SMD VLIW Architecture", 6pp., FatemiRealArchitecture.pdf—Proc. 4th Progress Workshop on Embedded Systems (Nieuwegein, Oct.22), 2003.
Manoj Seshadrinathan et al.., "Pose Invariant Face Detection", manojeurasip. . pdf—4th Eurasip Conference focused on Video/ Image Processing and Multimedia Communication, (EURASIP'03), Zagreb, Croatia,vol. 2 pp. 405-410, Jul. 2003.
Mi-Suen Lee et al., Real-Time Skin-Tone Detection with a Single-Chip Digital Camera', 4pp., Xetal.pdf 2001. Proceedings. 2001 International Conference on Image Processing.
Michael J. Jones et al., "Statistical Color Models with Application to Skin Detection", pp. 1-22, jones99statistical—International Journal of Computer Vision, 1999.

(Continued)

*Primary Examiner* — Matthew Bella
*Assistant Examiner* — Eric Rush

(57) ABSTRACT

An image processing system provides faster than real-time skin detection and localization. The system uses the highly optimized architecture of a graphics processing unit to quickly and efficiently detect and locate skin in an image. By performing skin detection and localization on the graphics processing unit, the image processing system frees the main system processor to perform other important tasks, including running general purpose applications. The speed with which the image processing system detects and localizes skin also facilitates subsequent processing steps such as face detection and motion tracking.

22 Claims, 14 Drawing Sheets

OTHER PUBLICATIONS

Hualu Wang et al., "A Higly Efficient System for Automatic Face Region Detection in MPEG Video", pp. 615-628, FaceRegionDetectionInVideo.pdf—IEEE Transactions for Circuits and Systems in Video Technology, Aug. 1997.

* cited by examiner

IMAGE PROCESSING SYSTEM FOR SKIN DETECTION AND LOCALIZATION

BACKGROUND OF THE INVENTION

1. Technical Field

The invention relates to image processing. In particular, the invention relates to skin detection and localization in an image.

2. Related Art

Continuous and rapid developments in imaging technology have produced correspondingly greater demands on image processing systems. Extensive improvements in imaging technology have given rise to larger and higher resolution image data sets, which in turn require faster and more efficient processing systems to maintain an acceptable level of system responsiveness. At the same time, an increasing number of industries, ranging from security to medicine to manufacturing, have turned to image processing to keep pace with the demands of modern marketplaces.

For example, image processing to detect skin is an important first step in many security industry applications, including facial recognition and motion tracking. In the case of facial recognition, before a security application can compare a face to the faces in a database, an image processing system must first determine whether or not a video or static image even contains skin. If the image does contain skin, the image processing system must determine where in that image the skin is located and whether it is facial skin. Furthermore, it is often desirable to perform such skin and face detection in real-time to analyze, for example, a video stream running at 30 frames-per-second from a security camera.

In the past, a general purpose central processing unit (CPU) in an image processing system performed skin detection. Alternatively, costly and highly customized image processing hardware was sometimes designed and built to specifically detect skin in images. However, annual incremental advancements in general purpose CPU architectures do not directly correlate with an increased ability to perform specialized image processing functions such as skin detection and localization. Furthermore, the resources which a CPU may devote to skin detection are limited because the CPU must also execute other demanding general purpose system applications (e.g., word processors, spreadsheets, and computer aided design programs).

Therefore, past implementations of skin detection and localization were limited to two relatively unsatisfactory options: reduced speed and efficiency of processing performed by a general purpose CPU, or the increased costs and complexity of highly customized hardware. For example, designing and manufacturing highly customized hardware for skin detection to accommodate the massive rollout of security cameras throughout major cities, or the increased security screening at airports, would prove extremely costly and impractical. Yet these and other applications are limited in effectiveness without high performance image processing solutions.

Therefore, a need exists for an improved processing system for skin detection and localization.

SUMMARY

An image processing system provides extremely fast skin detection and localization. The image processing system implements specialized processing techniques in a graphics processing unit (GPU) to perform the majority of the skin detection and localization processing. The main system processor is then free to perform other important tasks. The GPU speeds the detection and localization due to its highly optimized texture processing architecture. The image processing system thereby leads to a less expensive skin detection and localization solution, particularly compared to past systems which relied on highly customized image processing hardware.

The image processing system includes a system processor, a GPU, a system memory, and a skin detection program. The GPU includes a highly optimized graphics processing architecture including a texture memory and multiple pixel shaders. The system memory initially stores a probability table and the source image in which to detect skin. The skin detection program uploads the probability table and the source image from the system memory to the texture memory in the GPU. The skin detection program then defines a render target with respect to the source image and issues a draw call to the GPU. The draw call initiates texture mapping by the pixel shaders of the source image and the probability table onto the render target. The texture mapping operation, in conjunction with a skin threshold (e.g., an alpha test threshold), determines which of the pixels rendered in the render target are considered skin pixels.

In addition to determining whether skin exists in the source image, the image processing system may also locate the skin. To that end, the image processing system includes a skin location program. In one implementation, the skin location program performs a block tree search (e.g., a quad tree search) of the source image. As will be explained in more detail below, in performing the block tree search, the skin location program iteratively issues draw calls to the GPU to cause the pixel shaders to texture map the probability table onto progressively smaller render targets positioned within the source image. The skin location program stores the locations in the source image where skin pixels were found in the system memory.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

The elements illustrated in the Figures function as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the image processing system may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the image processing system will be described, methods, systems, and articles of manufacture consistent with the systems may include additional or different components. For example, a system processor may be implemented as a microprocessor, microcontroller, application specific integrated circuit (ASIC), discrete logic, or a combination of other type of circuits or logic. Similarly, memories may be DRAM, SRAM, Flash or any other type of memory. Parameters (e.g., thresholds), databases, tables, and other data structures may be separately stored and managed, may be incorporated into a single memory or database, or may be logically and physically organized in many different ways. Programs may be parts of a single program, separate programs, or distributed across several memories and processors.

Figure 1:
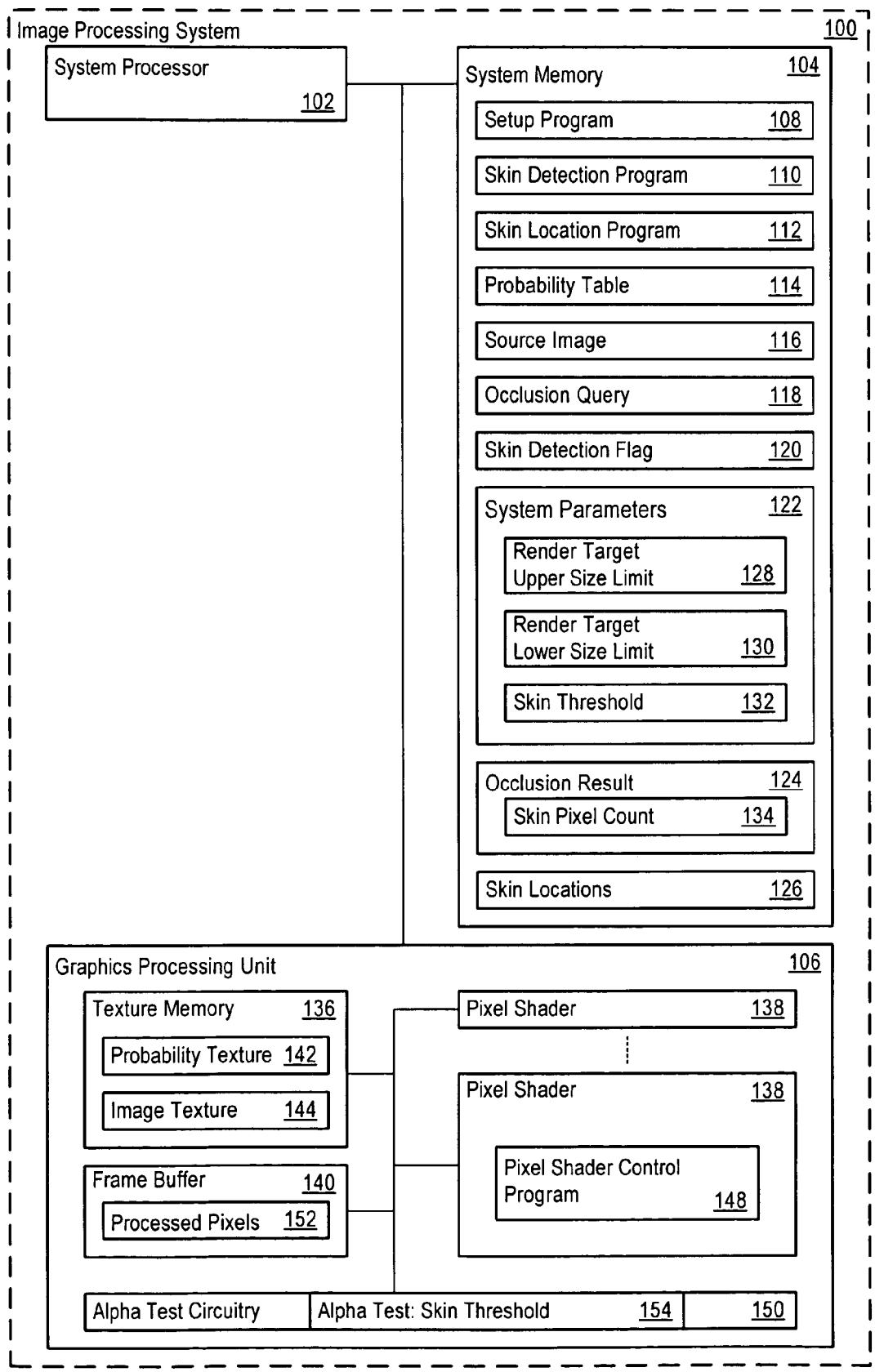
FIG. 1 shows an image processing system which detects and localizes skin in a source image.

FIG. 1 shows an image processing system 100 which provides faster than real-time skin detection and localization. The image processing system 100 includes a system processor 102, a system memory 104, and a GPU 106. The GPU may be a graphics processor available from NVIDIA of Santa Clara, Calif. or ATI Research, Inc of Marlborough, Mass., as examples. As will be described in more detail below, the system processor 102 executes a setup program 108, a skin detection program 110, and a skin location program 112 from the system memory 104. The system memory 104 stores a probability table 114, a source image 116, and an occlusion query 118. The system memory 104 also stores a skin detection flag 120, system parameters 122, an occlusion result 124, and skin locations 126. The system parameters 122 may include a render target upper size limit 128, a render target lower size limit 130, and a skin threshold 132. The memory also stores an occlusion result 124 obtained from the GPU 106. The occlusion result 124 may provide a skin pixel count 134.

The GPU 106 includes a texture memory 136, multiple parallel pixel shaders 138, and a frame buffer 140. The texture memory 136 stores a probability texture 142 and an image texture 144. Multiple parallel pixel shaders 138 process the probability texture 142 and image texture 144 in response to draw calls from the system processor 102. The multiple parallel pixel shaders 138 execute a pixel shader control program 148. Alpha test circuitry 150 filters the pixels processed by the pixel shaders 138. In particular, the alpha test circuitry 150 applies an alpha test 154 to determine whether to keep or discard texture processed pixels. The system processor 102 may establish the skin threshold 132 or other filter parameter for the alpha test 154. The skin threshold 132 represents a probability below which texture processed pixels are not likely enough to be skin to count as skin pixels. The GPU 106 discards such pixels, but stores the pixels which pass the alpha test 154 as processed pixels 152 in the frame buffer 140.

The source image 116 may be obtained from a video stream, a digital camera, or other source. The source image 116 includes image data represented in a particular color space, such as the RGB color space. The image processing system 100, however, may process images with image data represented in other color spaces. The image processing system 100 obtains and stores the source image 116 in the system memory 104 for processing.

The system processor 102 executes the setup program 108 as a precursor to executing the skin detection program 110 and/or the skin location program 112. The programs 112 and 114 employ the probability table 114 and source image 116 in conjunction with the GPU 106 to rapidly detect and/or locate skin in the source image 116. The setup program 108 provides the probability table 114 and the source image 116 to the GPU 106 in preparation for texture mapping operations.

The image processing system 100 stores a probability table 114 constructed based on an analysis of images containing skin. The probability table 114 stores the probability that, for any particular pixel expressed in the color coordinate index (e.g., Cb-Cr) of the probability table 114, the pixel is a skin pixel. Each possible value of Cb and Cr defines a color location in the probability table 114 at which a skin probability is stored. The probability table 114 may be pre-established in the system 100, or the image processing system 100 may obtain the probability table 114 from an external source, such as the sources described and shown with reference to FIG. 14. The system processor 102 may dynamically change the probability table 114 during processing to adapt the skin detection and location to any particular probability criteria.

Figure 2:
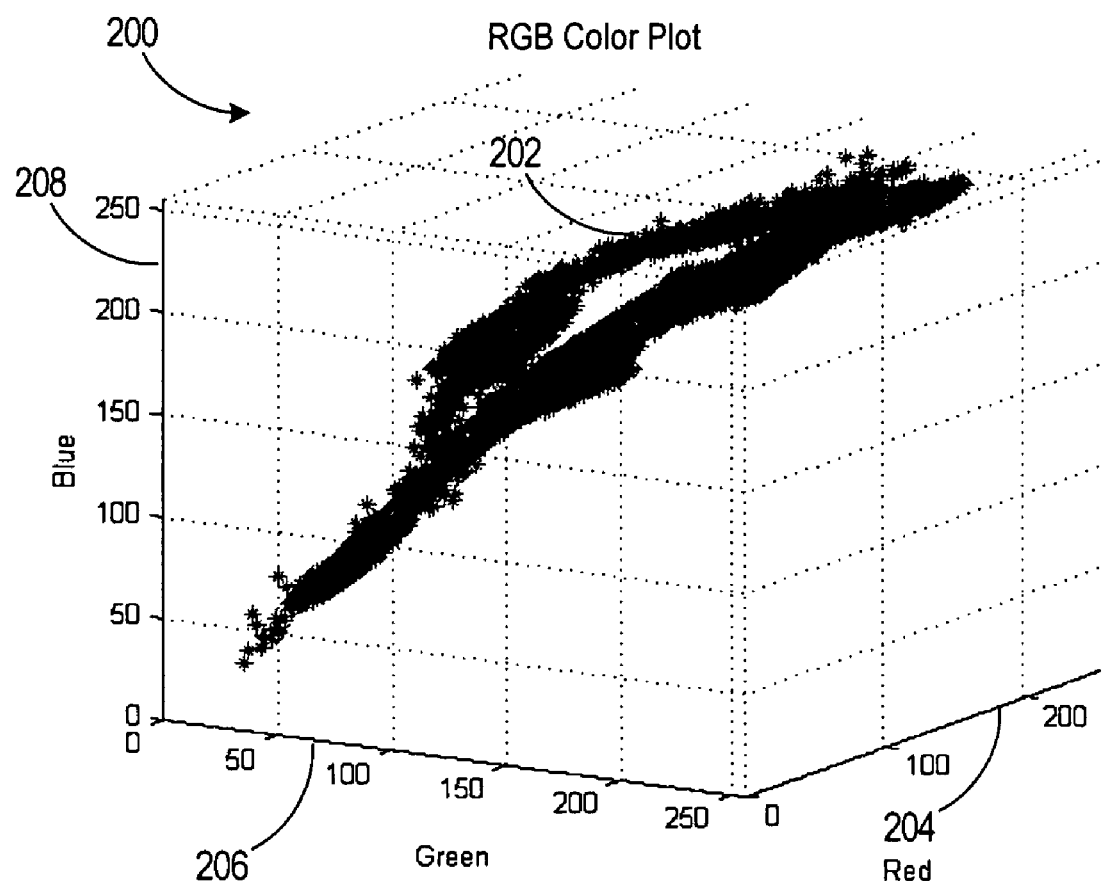
FIG. 2 shows an RGB color space including a plot of RGB color values for a set of skin samples.

FIG. 2 shows a plot 200 of RGB color values for a set of known skin samples 202 along a Red axis 204, a Green axis 206, and a Blue axis 208. The RGB plot 202 exhibits a significant smear of the skin samples throughout the RGB color space. The variance along each axis 204, 206, and 208 makes distinguishing between skin and non-skin pixels difficult in the RGB color space. When the RGB color values are expressed or converted to the Y-Cb-Cr color space, however, the skin pixels localize, pointing to a clearer differentiation between skin and non-skin pixels.

Figure 3:
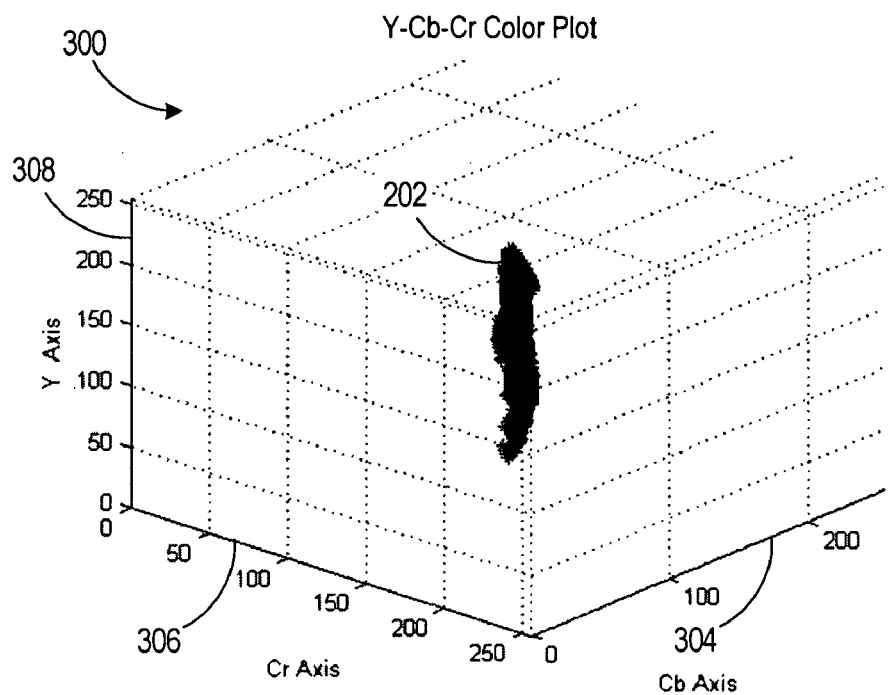
FIG. 3 shows a Y-Cb-Cr color space including a plot of Y-Cb-Cr color values for a set of skin samples, and a two-dimensional Cb-Cr color space including a plot of the skin samples with respect to only the Cb-Cr values.
Figure 3:
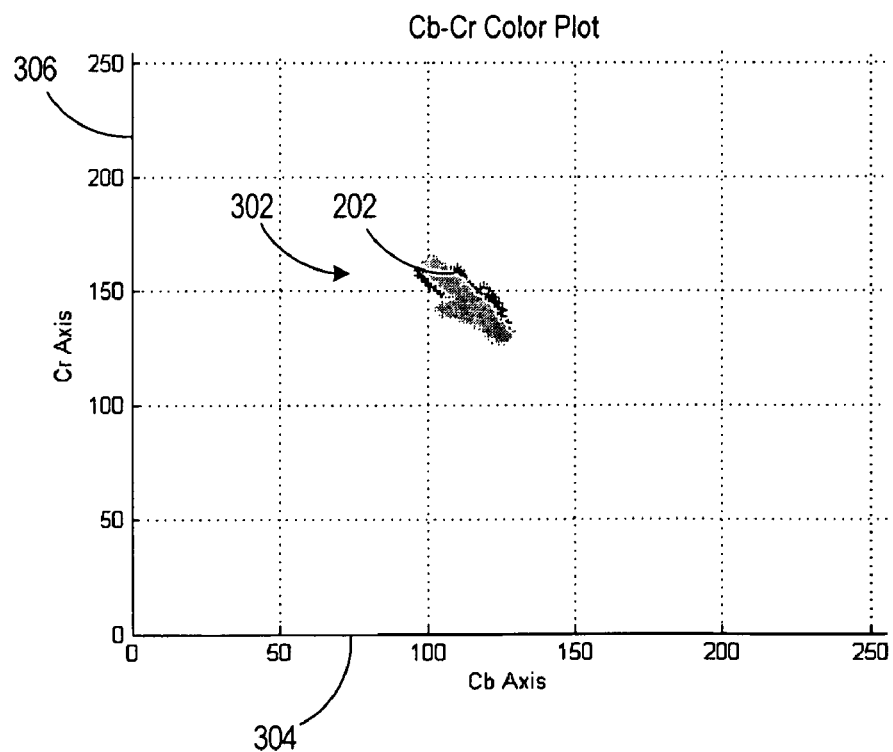

FIG. 3 shows a plot 300 of Y-Cb-Cr color values for the set of skin samples 202, and a two-dimensional plot 302 of the skin samples 202 with respect to only the Cb-Cr values. The Y-Cb-Cr plot 300 demonstrates tight clustering of the skin samples 202 along the Cb and Cr axes 304 and 306. The Y axis 308, which represents luminance, exhibits the largest amount of variance within the Y-Cb-Cr plot 300 of the skin samples. Variation in the luminance value is largely imperceptible to the human eye. Dropping the luminance value results in the two dimensional Cb-Cr plot 302 of the skin samples 202. The skin samples 202 tend to cluster together with a small amount of variance in the Cb-Cr color space.

Figure 4:
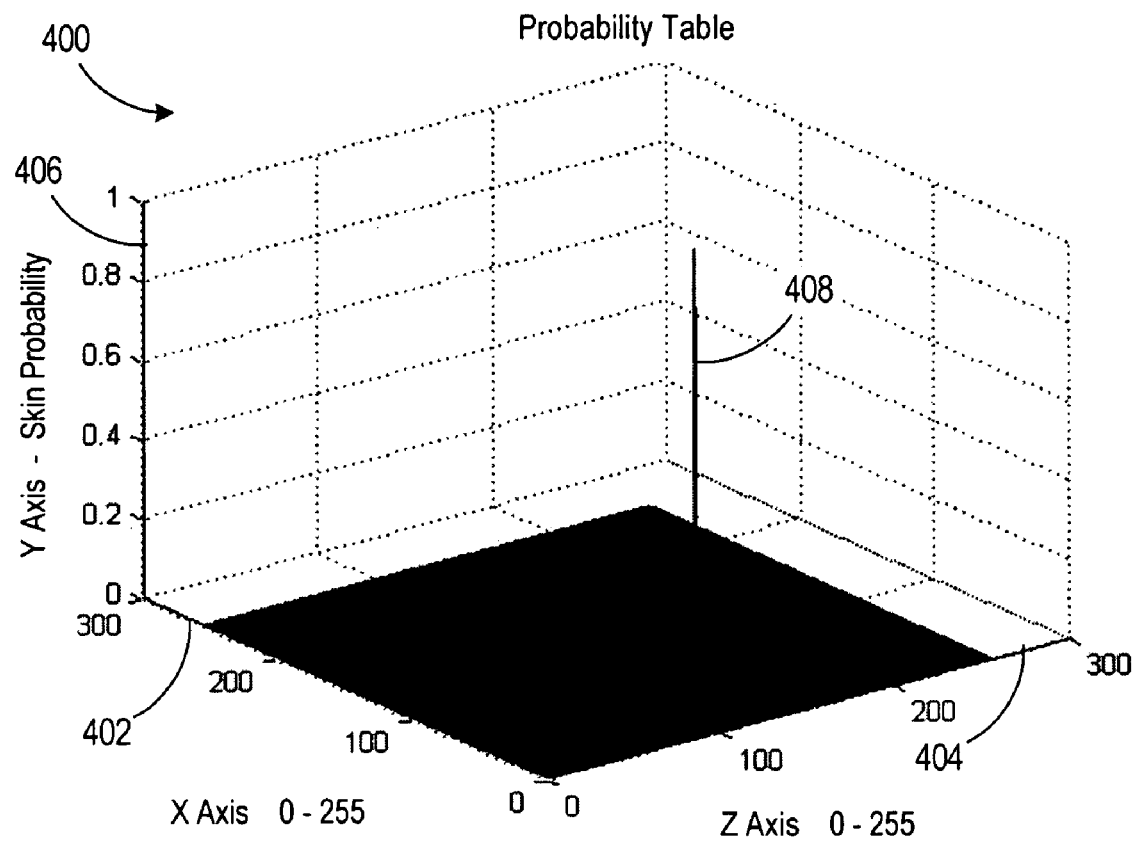
FIG. 4 shows a probability plot obtained from the Cb-Cr color space shown in FIG. 3.

FIG. 4 shows a probability table 400 obtained from the two dimensional Cb-Cr color space 302 shown in FIG. 3. The probability table 400 is setup along a color coordinate index formed from the Cb and Cr (X and Z) axes 402 and 404. Each index location defines a possible color in the Cb-Cr color space. The probability table 400 establishes a skin probability (e.g., the skin probability 408) along the Y axis 406 at each color location.

The probability table 400 may be constructed by binning the Cb-Cr color values of the skin sample set 202 into a 255×255 table, represented by the X and Z axes 402 and 404. The skin probability represented by the Y axis may be determined by dividing each binned value by the total number of skin samples. The clustered nature of the skin samples 202 in the Cb-Cr color model results in the relatively large skin probability 408 shown in the probability table 400.

Figure 5:
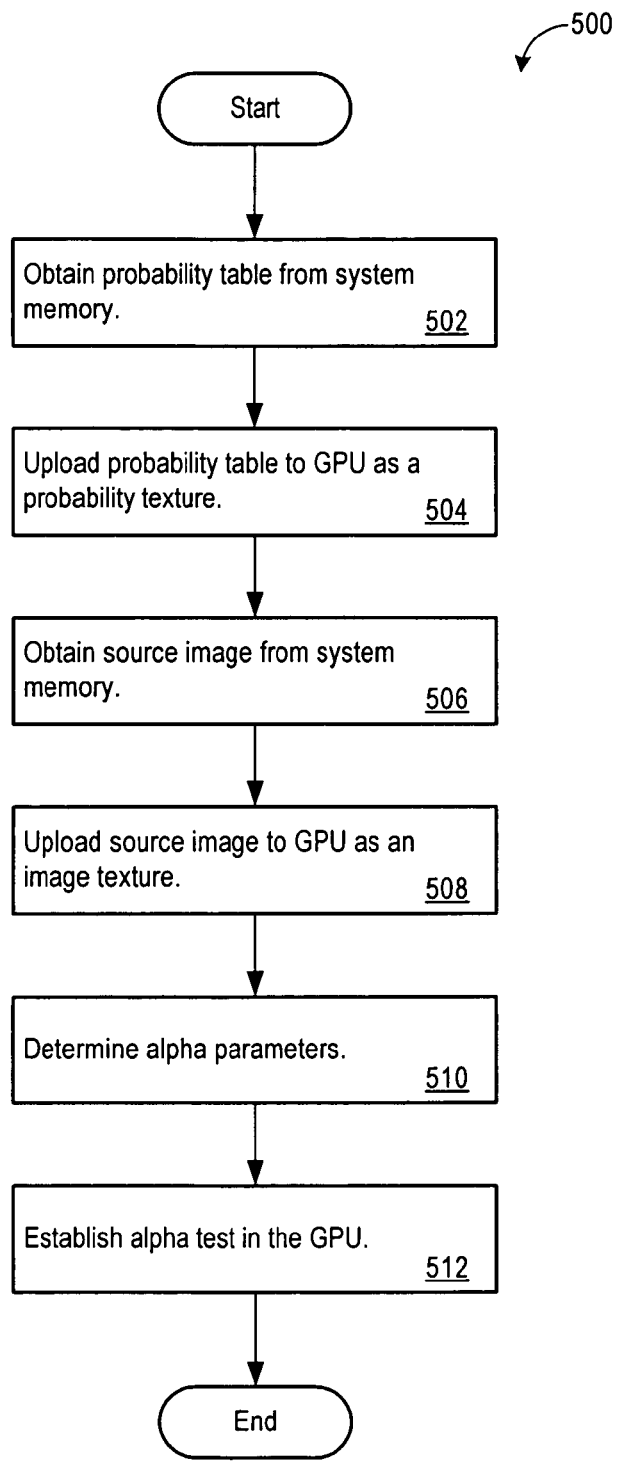
FIG. 5 shows the acts which a setup program may take to setup a GPU for skin detection or localization.

Returning to FIG. 1, the setup program 108 uploads the probability table 114 and source image 116 to the GPU 106. The GPU 106 stores the probability table 114 as the probability texture 142 and stores the source image 116 as the image texture 144 in the texture memory 136. The setup program 108 may also determine the alpha parameters (e.g., the skin threshold 132) for the alpha test circuitry 150 and upload the parameters to the alpha test circuitry 150 in the GPU 106. The alpha test circuitry 150 compares the skin threshold 132 against texture determinations made by the pixel shaders 138 to determine whether the textured pixels should be considered skin pixels. The acts performed by the setup program 108 are shown in FIG. 5 and are described in more detail below.

Figure 6:
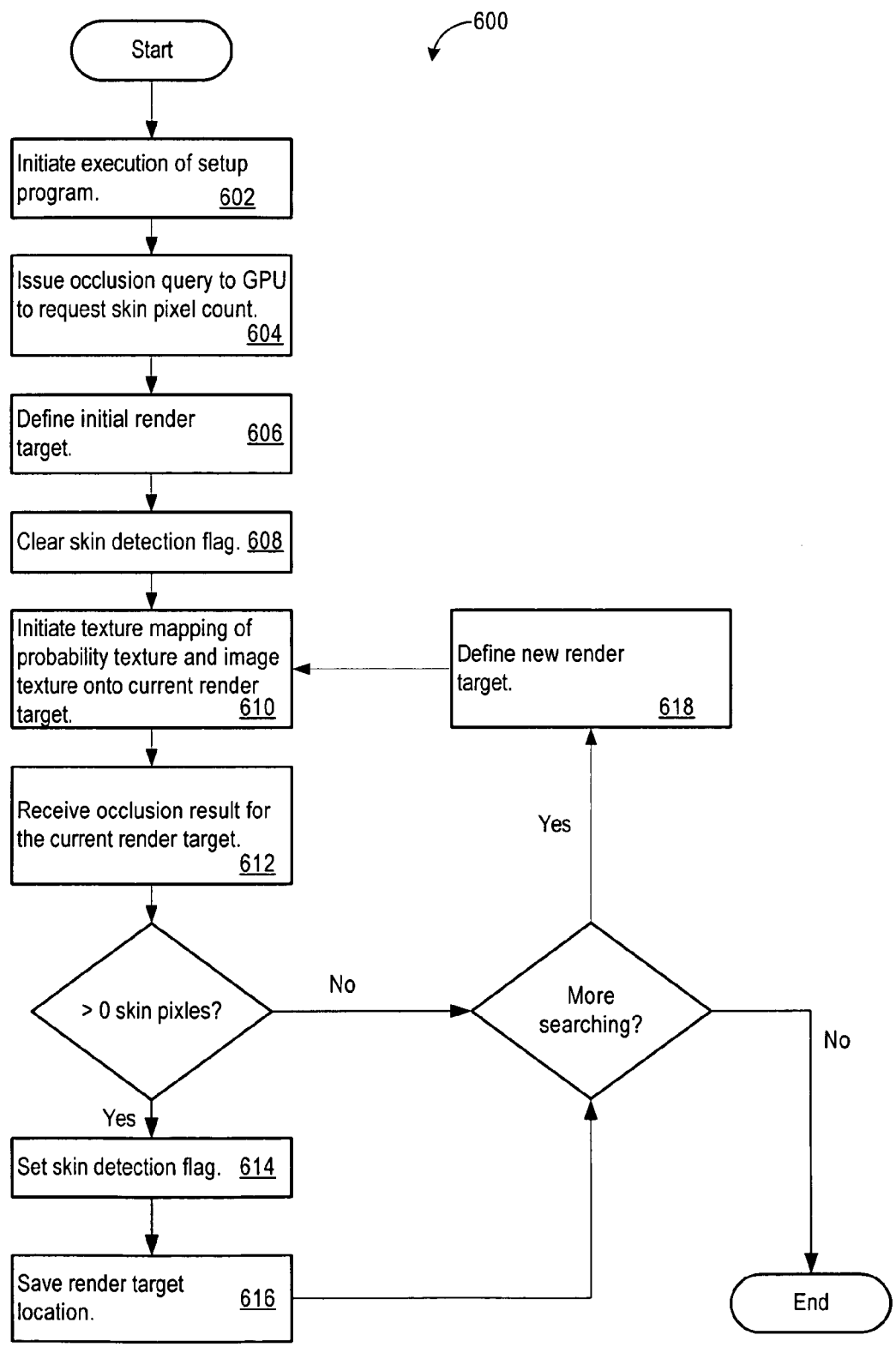
FIG. 6 shows the acts which a skin detection program may take to determine whether skin exists in a source image.

The skin detection program 110 detects whether or not the source image 116 contains skin. The skin detection program 110 issues draw calls to initiate texture mapping in the multiple parallel pixel shaders 138. The skin detection program 110 also issues an occlusion query 118 to the GPU 106 to determine the skin pixel count 134. The skin pixel count 134 is the number of pixels which pass the alpha test 154 and are considered skin pixels. These pixels may also be written to the frame buffer 140. The skin detection program 110 sets or clears the skin detection flag 120 depending on whether or not the occlusion result 124 returns a non-zero skin pixel count 134. Accordingly, the skin detection program 110 may act as a fast filter to determine whether skin exists at all in the source image 116. The acts taken by the skin detection program 110 are shown in FIG. 6 and are described in more detail below.

The skin location program 112 locates skin in the source image 116. In one implementation, the skin location program 112 executes a block tree search of the source image 116 to locate skin pixels. The skin location program 112 initially searches regions of the source image 116 defined by the render target upper size limit 128. In a region where skin pixels are detected, the skin location program 112 subdivides that region and searches for pixels within those subregions. The skin location program 112 may continue subdividing and searching until the size of the subregions equals the render target lower size limit 130.

Figure 7:
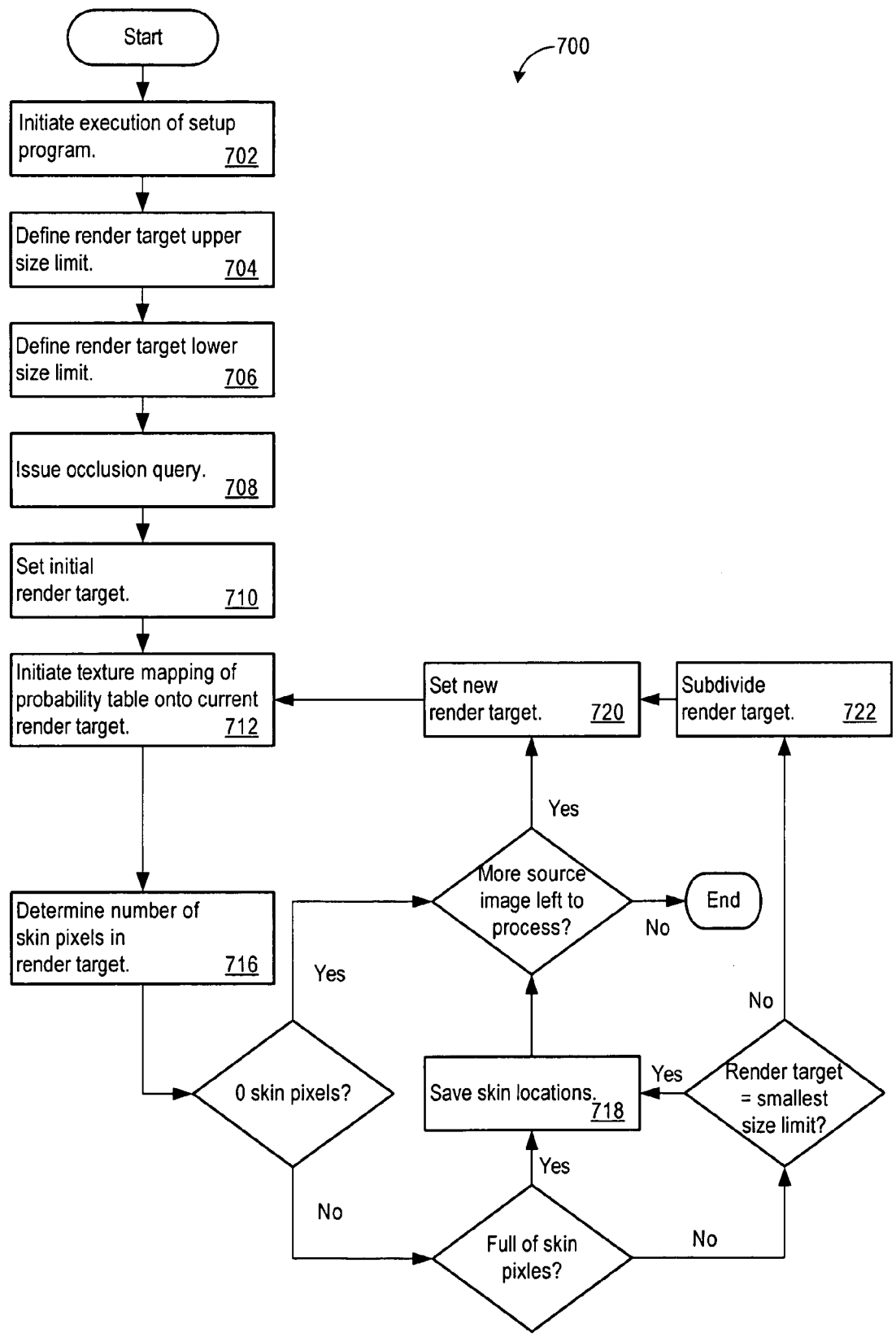
FIG. 7 shows the acts which a skin location program may take to locate skin within a source image.

In this manner, the skin location program 112 efficiently and accurately locates skin within the source image 116, at a resolution corresponding to the lower size limit of the render target. The skin location program 112 stores the skin locations 126 (e.g., the locations of render targets which have a non-zero skin pixel count) in the system memory 104. The acts performed by the skin location program 112 are shown in FIG. 7 and are described in more detail below.

The skin detection program 110 and skin location program 112 include instructions that issue draw calls to the GPU 106 to initiate texture mapping in the multiple parallel pixel shaders 138. The multiple parallel pixel shaders 138 texture map the probability texture 142 and the image texture 144 onto a render target. The render target may be defined by vertices which bound the render target (e.g., upper left and lower right vertices).

The programs 110 and 112 receive the occlusion result 124 arising from texture mapping the render target. The occlusion result 124 specifies the number of skin pixels which pass the alpha test applied by the alpha test circuitry 150. The programs 110 and 112 may save the locations where skin is found (e.g., by saving the render target locations with respect to the source image 116). After executing the skin detection and/or location programs 112 and 114, the image processing system 100 may report the skin pixel count 134 or skin locations 126 to other applications or may use the skin pixel count 134 or skin locations 126 for other purposes.

FIG. 5 shows the acts 500 which the setup program 108 may take to setup the GPU 106 for skin detection or localization. The setup program 108 obtains the probability table 114 from the system memory 104 (Act 502). The setup program 108 then uploads the probability table 114 to the GPU texture memory 136 as the probability texture 142 (Act 504). The setup program 108 also obtains the source image 116 from the system memory 104 (Act 506), and uploads the source image 116 to the GPU texture memory 136 as the image texture 144 (Act 508). The image processing system 100 may thereby apply the speed and parallel processing capabilities of the multiple parallel pixels shaders in the GPU 106 to detect and locate skin in the source image 116.

The setup program 108 may also determine alpha parameters (Act 510). The alpha parameters may include the skin threshold 132 or other criteria used for the alpha test 154 in the alpha test circuitry 150. The alpha test circuitry 150 determines whether or not a texture processed pixel qualifies as a skin pixel. As described in more detail below in reference to FIG. 14, the setup program 108 may also determine the alpha parameter based upon values provided external systems, such as systems requesting skin detection or location in the source image 116 by the image processing system 100. The setup program 108 establishes the alpha test 154 in the GPU 106 (Act 512) prior to skin detection or localization.

FIG. 6 shows the acts 600 which the skin detection program 110 may take to determine whether skin exists in the source image 116. The skin detection program 110 initiates execution of the setup program 108 (Act 602). As described above, the setup program 108 uploads the probability table 114 and the source image 116 to the texture memory 136 as the probability texture 142 and image texture 144 respectively.

The skin detection program 110 issues the occlusion query 118 to the GPU 106 to request a skin pixel count 134 (Act 604). The occlusion query 118 returns the number of pixels that pass the alpha test 154 for any given render target. The skin detection program 110 also defines the initial render target (Act 606). To that end, the skin detection program 110 determines the size and location of the render target with respect to the source image 116. The initial render target may be a rectangle which has the upper size limit 128 (e.g., the entire size of the source image 116) or may be as small as the lower size limit 130 (e.g., a single pixel).

The skin detection program 110 clears the skin detection flag 120 (Act 608) and initiates texture mapping of the probability texture 142 and image texture 144 onto the current render target (Act 610). To do so, the skin detection program 110 issues a draw call to the GPU 106 to initiate texture mapping by the multiple parallel pixel shaders 138 under control of the pixel shader control program 148. The GPU 106 determines the transparency of each pixel in the render target, performs the alpha test 154, and returns the occlusion result 124, including the skin pixel count 134. The skin detection program 110 receives an occlusion result 124 which contains the skin pixel count 134 of the current render target. (Act 612).

If the skin pixel count is non-zero, the skin detection program 110 sets the skin detection flag 120 (Act 614) and may save the render target location at which skin was located (Act 616). In other implementations, the skin detection flag 120 may be set when a threshold number of skin pixels are located (e.g., 5% or more of the image contains skin). If the skin detection program 110 will search for skin in other parts of the image, the skin detection program 110 defines a new render target (e.g., a larger render target, smaller render target, or a new location for the render target) (Act 618) and initiates texture mapping on the current render target (Act 610).

FIG. 7 shows the acts which the skin location program 112 may take to locate skin within the source image 116. Although the example below assumes the skin location program 112 locates skin throughout the source image 116, it is noted that the skin location program 112 may instead selectively locate skin in one or more sub-portions of the source image 116. The skin location program 112 initiates execution of the setup program 108 (Act 702). As described above, the setup program 108 uploads the probability table 114 and the source image 116 to the texture memory 136 as the probability texture 142 and image texture 144 respectively. The setup program 108 may also determine the alpha parameters and establish the alpha test 154 in the GPU 106.

The skin location program 112 defines the render target upper size limit 128 (Act 704). The skin location program 112 may define the render target upper size limit 128 as the size of the entire source image 116, or as any subregion of the source image 116. The skin location program 112 also defines the render target lower size limit 130 (Act 706). The render target lower size limit 130 determines a lower bound on the size of the render target (e.g., 64×64 pixels, 16×16 pixels, 1×1 pixel, or any other lower bound). As the render target decreases in size, the location accuracy increases.

The skin location program 112 issues the occlusion query 118 to the GPU 106 (Act 708). The skin location program 112 sets an initial render target (Act 710). For example, the skin location program 112 may set the initial render target to the render target upper size limit 128, and select a position (e.g., the upper left hand corner of the source image) for the render target.

The skin location program 112 makes a draw call to the GPU 106 to initiate texture mapping of the probability texture 142 and image texture 144 onto the current render target (Act 712). Alpha testing in the GPU acts as a filter on the transparency values of the texture mapped pixels to determine the number of texture mapped pixels which qualify as skin pixels. The skin pixel count 134 is returned in the occlusion result 124.

When the render target is full or skin pixels or empty of skin pixels, the skin location program 112 does not subdivide the render target. When the render target is full of skin pixels, the skin location program 112 saves the render target locations as skin locations 126 (Act 718). The skin location program 112 may also save the contents of the render target in the memory 104. If more of the source image remains to be processed, the skin location program 112 sets a new render target (Act 720) (e.g., moves the render target to a new location with respect to the source image) and again initiates texture mapping.

If the render target was partially full of skin pixels, the skin location program 112 determines whether the render target has reached the lower size limit 130. If so, the skin location program 112 saves the skin locations (Act 718) and determines whether more of the source image remains to be processed. Otherwise, the skin location program subdivides the render target (Act 722). For example, when applying a quadtree search strategy, the skin location program 112 may subdivide the render into four smaller render targets. A new, smaller, render target is therefore set (Act 720), and the skin location program 112 again initiates texture mapping.

In the example above, the skin location program 112 did not subdivide a render target which was completely empty of skin pixels or full of skin pixels. In other implementations, the skin location program 112 may also be configured to process a partially filled render target as if it contained either zero skin pixels, or all skin pixels. For example, the skin location program 112 may process a render target containing between zero and a threshold number of skin pixels as if the render target contained zero skin pixels. Likewise, the skin location program 112 may process a render target containing between a given threshold of skin pixels and all skin pixels as if the render target were full of skin pixels.

The skin location program 112 described above may also execute skin location using predicated draw calls. A predicated draw call used in the skin location program 112 is a draw call which instructs the GPU to draw a particular render target, and if skin is detected in that render target, to subdivide the render target into subregions and draw those subregions. Accordingly, the skin location program 112 issues one draw call to draw the render target and the four smaller render targets as opposed to issuing up to five draw calls to draw the same regions.

Figure 8:
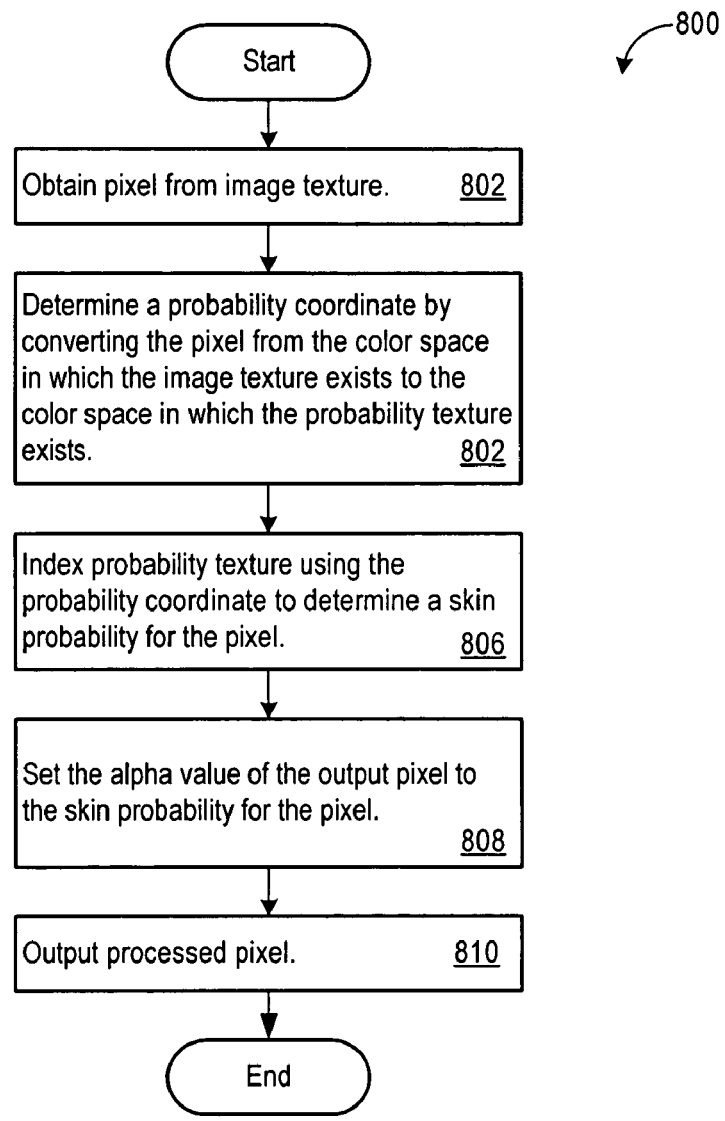
FIG. 8 shows the acts which a pixel shader control program may take in a GPU for skin detection and localization to identify skin pixels in a source image.

FIG. 8 shows the acts which the pixel shader control program 148 may take in the GPU 106 for skin detection and localization to identify skin pixels in the source image 116. The pixel shader control program 148 obtains a pixel from the image texture 144 (Act 802). The pixel shader control program 148 converts the pixel from the color space in which the image texture 144 exists, such as the RGB color space, to the color space in which the probability texture 142 exists, such as the Cb-Cr color space (Act 804). The converted pixel becomes a probability coordinate which the pixel shader control program 148 indexes into the probability texture 142.

The pixel shader control program 148 determines the skin probability for the pixel by indexing the probability coordinate into the probability texture 142 (Act 806). The indexed value resulting from the texture mapping described above may be an RGBA value, where A contains the probability that the pixel's Cb-Cr value is skin. The pixel shader control program 148 sets the alpha value of the output pixel to the skin probability obtained from the probability texture (Act 808). In this instance the RGB values may contain other data such as the type of skin the pixel contains. The resulting indexed value may also be a one value component texture containing the probability that the pixel contains skin. In these examples, the pixel shader control program 148 sets the A value as the transparency of the indexed pixel. The pixel shader control program 148, however, may output any other component on any other axis of the probability texture 142 as the rendered pixel output value (e.g., the transparency value) for the pixel.

The pixel shader control program 148 then outputs the texture mapped pixel 152 (Act 810), which is then subject to the alpha test to determine whether the pixel qualifies as a skin pixel. Table 1, below, shows one example of a pixel shader control program which converts RBG to Cb-Cr and in which 'MainTexture' refers to the image texture 144, 'dot' is a dot product operation, and 'tex2D' refers to the probability texture 142.

TABLE 1

```
struct VS_OUTPUT
{
    float4 Position : POSITION;
    float4 Color    : COLOR;
    float2 TexCoords0 : TEXCOORD0;
    float2 TexCoords1 : TEXCOORD1;
};
struct PS_OUTPUT
{
    float4 Color : COLOR;
};
sampler MainTexture : register(s0);
sampler CbCrBinTexture : register(s1);
PS_OUTPUT main(const VS_OUTPUT OutVertex)
{
    PS_OUTPUT OutPixel;
    float2 cbcrcolors;
    float2 cbcrwithrange;
    float4 CbConverter = {-0.168736, -0.331264, 0.500, 0.00};
    float4 CrConverter = {0.500, -0.418688, -0.081312, 0.00};
    cbcrcolors.x = dot(CbConverter, tex2D(MainTexture,
        OutVertex.TexCoords0));
    cbcrcolors.y = dot(CrConverter, tex2D(MainTexture,
        OutVertex.TexCoords0));
    cbcrwithrange.y = cbcrcolors.x * 0.8784 + 0.5020;
    cbcrwithrange.x = cbcrcolors.y * 0.8784 + 0.5020;
    float4 retcolor = tex2D(CbCrBinTexture, cbcrwithrange);
    OutPixel.Color = retcolor.r;
    return OutPixel;
}
```

Table 2 shows another example of a pixel shader control program 148 in which the textured pixel is determined using a 3D direction vector to index into six 2D textures arranged into a cube map. The cube map texture construct is a set of six textures, each representing the side of a three-dimensional cube. The pixel shader control program may use any three component RGB value as a vector to point from the center of the cube to a spot on the cube wall.

TABLE 2

```
struct VS_OUTPUT
{
    float4 Position : POSITION;
    float4 Color    : COLOR;
    float2 TexCoords0 : TEXCOORD0;
    float2 TexCoords1 : TEXCOORD1;
};
struct PS_OUTPUT
{
    float4 Color : COLOR;
};
sampler MainTexture : register(s0);
sampler CbCrBinTexture : register(s1);
PS_OUTPUT main(const VS_OUTPUT OutVertex)
{
    PS_OUTPUT OutPixel;
    float4 Color1 = tex2D(MainTexture, OutVertex.TexCoords0);
    float4 retcolor = texCUBE(CubeMapTexture, Color1);
    OutPixel.Color = retcolor.r;
    return OutPixel;
}
```

Figure 9:
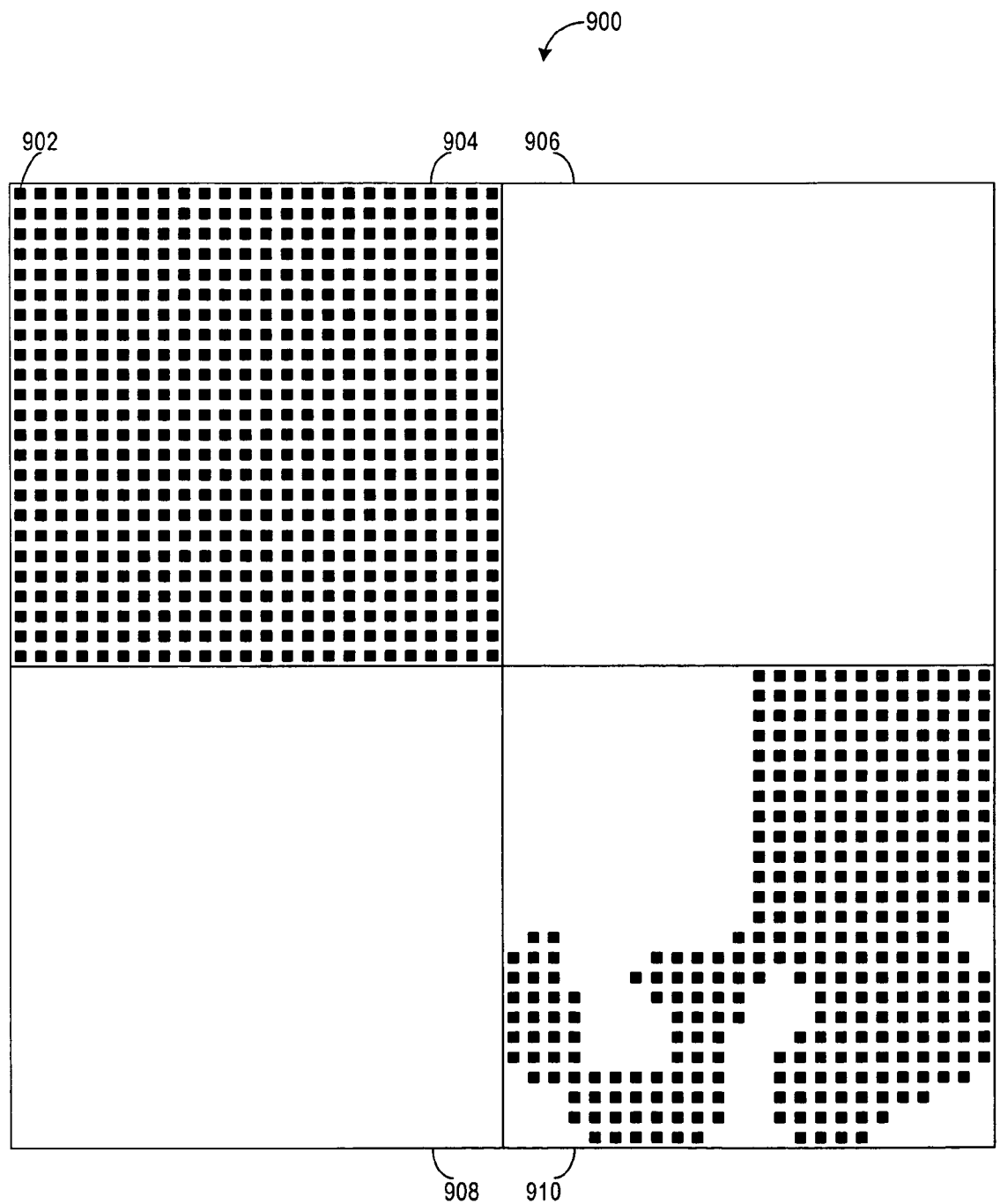
FIG. 9 shows a portion of a source image including skin pixels, and progressively smaller render targets.
Figure 10:
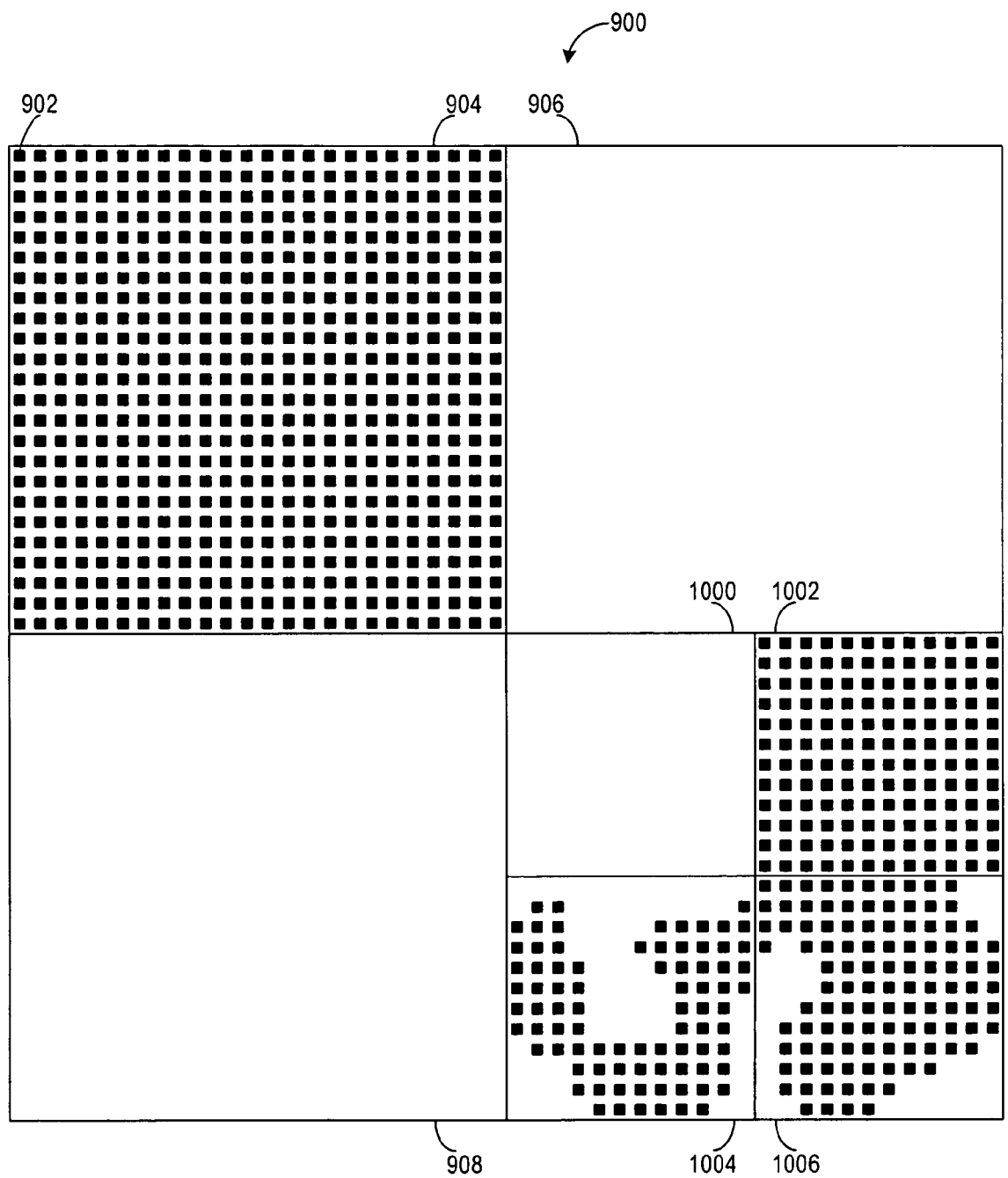
FIG. 10 shows a portion of a source image including skin pixels, and progressively smaller render targets.

FIGS. 9 and 10 show examples of a 48×48 pixel portion of a source image 900 including skin pixels 902, render targets 904, 906, 908, and 910, and progressively smaller render targets 1000, 1002, 1004, and 1006. FIGS. 9 and 10 illustrate steps the skin location program 112 may take to locate skin within the source image 900. In this example, the skin location program 112 sets the render target upper size limit 128 as 48×48, and the render target lower size limit 130 as 12×12. The skin location program 112 sets the 48×48 portion of the source 900 as the initial render target. The skin location program 112 initiates texture mapping of the probability texture 142 and image texture 144 onto the initial render target 900.

The skin location program 112 determines that the initial render target 900 contains more than zero, but less than all skin pixels 902. As a result, the skin location program 112 subdivides the initial render target 900 into four smaller 24×24 subregions 904-910. The skin location program 112 sets the upper left subregion 904 as the new render target and initiates texture mapping as to the render target 904.

The skin location program 112 determines that the render target 904 contains all skin pixels 902. The skin location program 112 stores the skin locations 126 in system memory 104. The skin location program 112 sets the upper right subregion 906 as the new render target because the skin location program 112 has not yet processed the entire subdivided render target 900. The skin location program 112 initiates texture mapping on the render target 906 and determines that it contains zero skin pixels 902. The skin location program 112 moves to the lower left subregion 908 as the new render target and determines that the render target 908 also contains zero skin pixels 902.

The skin location program 112 then moves to the lower right subregion 910 as the new render target and, after initiating texture mapping on to the render target 910, determines that the render target 910 contains more than zero, but less than all skin pixels 902. The render target 910, 24×24 pixels, has not reached the render target lower size limit 130. Accordingly, the skin detection program 110 subdivides the render target 910 (in this example, into four quadrants).

FIG. 10 shows the render target 910 subdivided into progressively smaller 12×12 subregions 1000-1006. The skin location program 112 sets one of the progressively smaller subregions 1000-1006 as the new render target. In this example, the skin location program 112 sets progressively smaller subregion 1000 as the new render target.

After determining that the render target 1000 contains zero skin pixels 902, and that less than the entire previously subdivided render target 910 has been processed, the skin location program 112 sets the progressively smaller subregion 1002 as the new render target. The skin location program 112 determines that the render target 1002 contains all skin pixels 902 and stores the skin location to system memory 104. The skin location program 112 sets progressively smaller subregion 1004 as the new render target. The skin location program 112 determines that the render target 1004 contains more than zero, but less than all skin pixels 902. The skin location program 112 also determines that the render target 1004 size equals the render target lower size limit 130.

The skin location program 112 stores the skin location into the system memory 104. Because less than the entire previously subdivided render target 910 has been processed, the skin location program 112 sets the progressively smaller subregion 1006 as the new render target. The skin location program 112 determines that the render target 1006 contains more than zero but less than all skin pixels 902. The skin location program 112 stores the render target 1006 to system memory 104 instead of subdividing further because the size of the render target 1006 equals the render target lower size limit 130. Thus, the skin location program 112 determines locations for the skin pixels 902 present in the portion of the source image 900.

Figure 11:
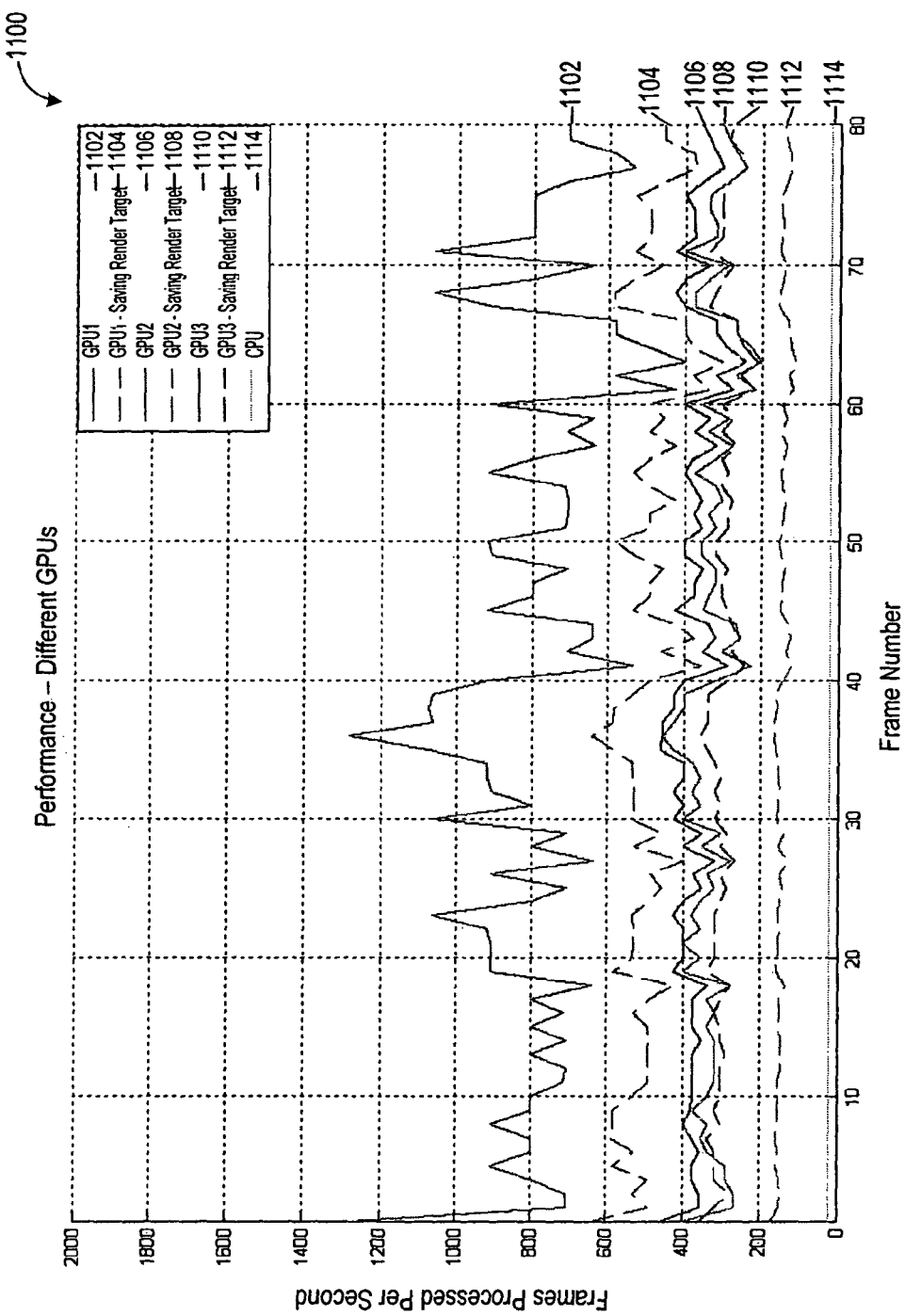
FIG. 11 shows a skin localization performance graph of an image processing system, in comparison to performing localization entirely on a general purpose CPU.

FIG. 11 shows a skin localization performance graph 1100 of the image processing system 100 in comparison to performing localization entirely on a general purpose CPU. The performance graph 1100 shows performance plots 1102-1112 achieved using modern GPUs 106. The performance plots 1102, 1106, and 1110 show system 100 performance using different GPUs where render targets are not saved. The performance plots 1106, 1108, and 1112 show system performance using different GPUs where render targets are save to memory 104. As demonstrated in FIG. 11, using the image processing system 100 to locate skin results in significantly improved performance (in some cases several hundred times faster) compared to the performance plot 1114 of skin location done on a general purpose CPU.

Figure 12:
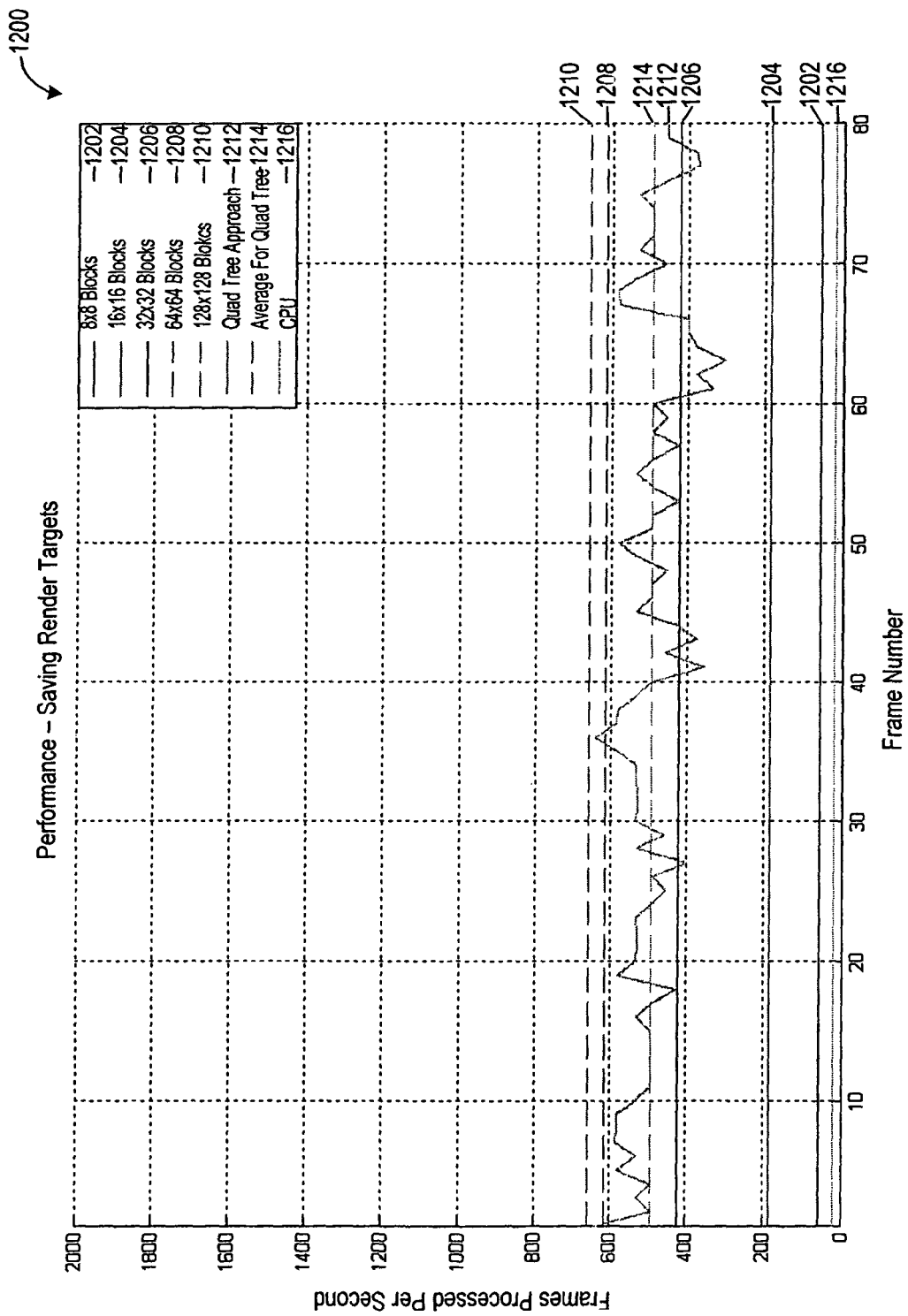
FIG. 12 shows a skin localization performance graph of an image processing system that saves the render target, in comparison to the performance of a general CPU.

FIG. 12 shows a skin localization performance graph 1200 of the image processing system 100 that saves the render target in comparison to the performance of a general CPU. The performance graph 1200 shows different performance plots 1202-1214 for the image processing system 100 when the image processing system 100 saves render targets of the following render target block levels: 8×8 blocks, plot 1202, 16×16 blocks, plot 1204, 32×32 blocks, plot 1206, 64×64 blocks, plot 1208, and 128×128 blocks, plot 1210. The performance graph 1200 also shows the performance 1212 and the average performance 1214 of the image processing system 100 where the image processing system 100 uses the quad tree approach to locating skin. As demonstrated by the performance graph 1200, the image processing system 100, even when saving 8×8 blocks, performs far faster (in some cases, hundreds of times faster) than processing on a general purpose CPU.

Figure 13:
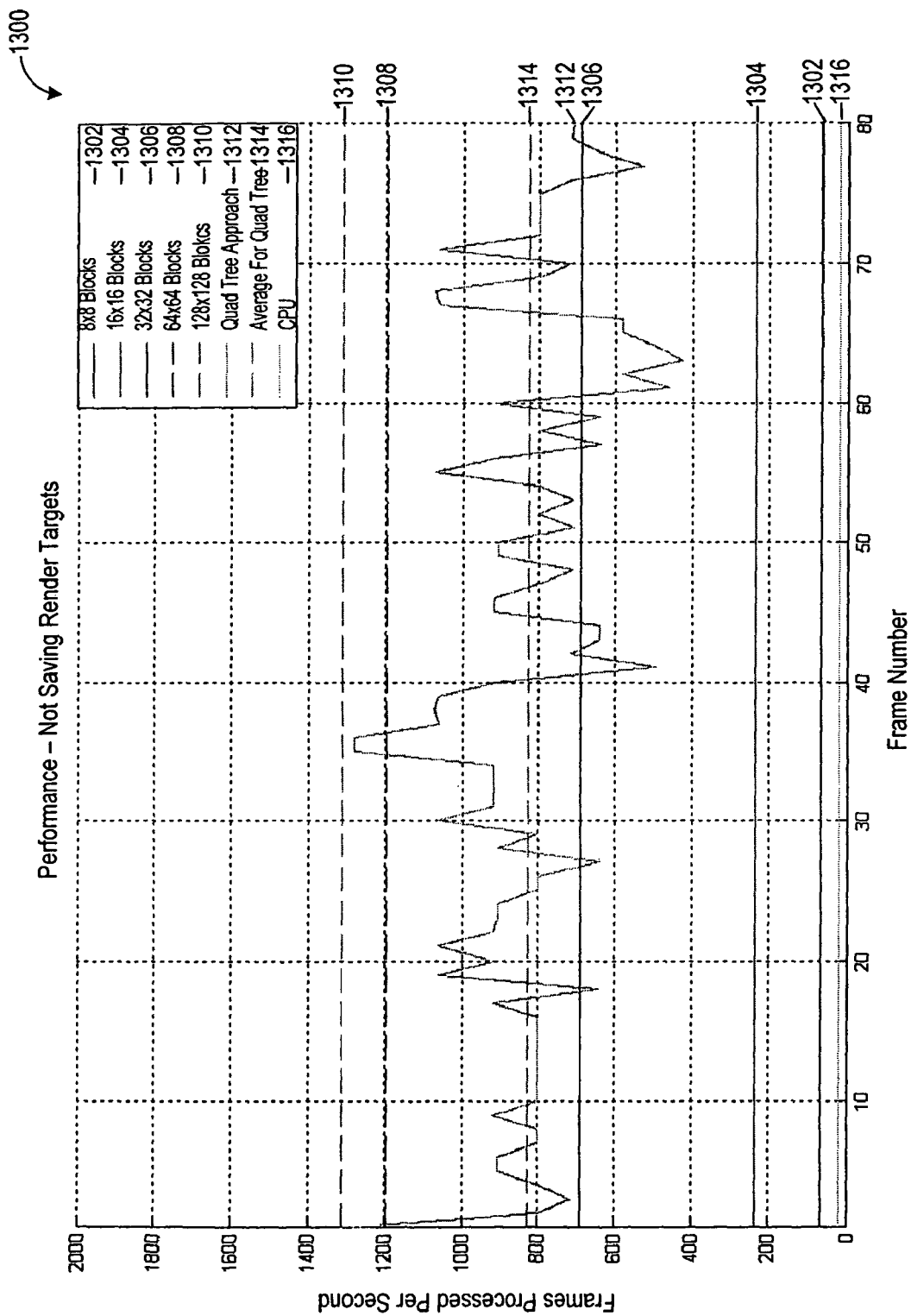
FIG. 13 shows a skin localization performance graph of an image processing system 100 under the assumption that the image processing system does not save the render target, in comparison to the performance of a general purpose CPU.

FIG. 13 shows a skin localization performance graph 1300 of the image processing system 100 under the assumption that the image processing system 100 does not save the render target, in comparison to the performance of a general purpose CPU. The performance of the following render target block levels are charted: 8×8 blocks, plot 1302; 16×16 blocks, plot 1304; 32×32 blocks, plot 1306; 64×64 blocks, plot 1308; and 128×128 blocks, plot 1310. The performance graph 1300 also shows the performance 1312 and the average performance 1314 of the image processing system 100 where the image processing system 100 uses the quad tree approach to locating skin. As demonstrated by the performance graph 1300, the image processing system 100 is far faster (typically many hundreds of times faster) than processing on a general purpose CPU.

The different performance plots in FIGS. 12 and 13 illustrate that there is overhead associated not only with saving the render targets, but also with issuing draw calls to the GPU. For example, FIG. 13 (which assumes that render targets are not saved) shows that issuing draw calls for 128×128 blocks over the render target yields higher performance than executing a significant number of additional draw calls for covering the render target using 8×8 blocks. Nevertheless, the performance is still greater than that of a general purpose CPU, and includes the added benefit of very high accuracy at a block size of 8×8, without saving the render target during the initial pass. The quad tree approach yields an intermediate level of performance (which is still far greater than that of a general purpose CPU) because that approach need not further subdivide blocks which are full or empty of pixels. The quad tree approach there need not drill down to the smallest block size in many instances.

Figure 14:
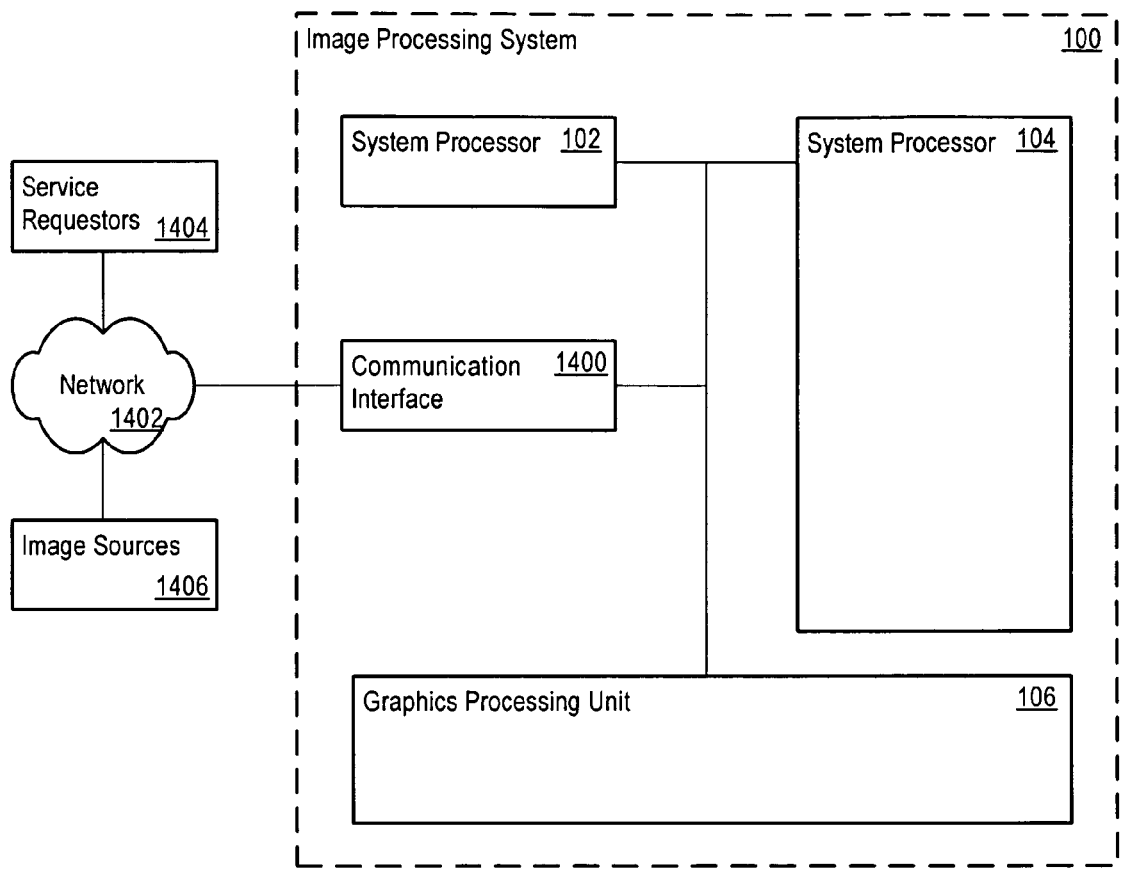
FIG. 14 shows an image processing system including a communication interface connected to a network.

FIG. 14 shows the image processing system 100, including a communication interface 1400 connected to a network 1402. The image processing system 100 communicates over the network 1402 with service requestors 1404 which, for example, submit source images, probability tables, and feature detection and/or location requests to the image processing system 100. The feature detection requests may be skin detection requests, or requests to detect other characteristics in the source image, such as hazardous substances. To that end, the service requestors may provide probability tables which establish probabilities for detecting the feature of interest (e.g., a probability table which assigns probabilities to certain colors being a hazardous substance). The service requesters 1404 may be, as examples, external security, surveillance, medicine, and/or other systems which request skin detection and/or localization in the source image 116. Alternatively or additionally, the image processing system 100 may obtain source images from the image sources 1406. The image sources 158 may include a video feed, digital camera, or other image source.

The service requesters 1404 may also provide other data to the image processing system 100. For example, each service requestor 1404 may provide a different feature detection threshold (e.g., a skin threshold 132) for use in a specific application. The service requestors 1404 may also specify the render target upper size limit 128, the render target lower size limit 130, or other parameters. For example, where the service requester 1404 requests highly accurate skin location in the source image 116, the image processing system 100 may set a relatively small (e.g., 8×8, 4×4, 2×2, or 1×1) render target lower size limit 130. When the service requester 1404 specifies less stringent accuracy requirements, the image processing system 100 may set a larger render target lower size limit 130.

The service requesters 1404 may use the skin detection and/or location data for a variety of applications. For example, the image processing system 100 may detect and locate skin in a source image 116 as a pre-processing step for a facial recognition system. In addition to skin detection and localization, the image processing system 100 described above may be used for other image processing tasks. For example, the image processing system 100 may be configured to detect and/or locate organic compounds for use at a security station in an airport, bus terminal, government office building, or other facility. In this example, the probability table 114 may be constructed based upon an image set of organic compound samples.

In another example, the image processing system 100 may be configured to detect and/or locate certain terrain, objects, or other details in satellite images. For example, using a probability table 114 based upon a set of marijuana field image samples, the image processing system 100 may detect and locate other marijuana fields in satellite or high altitude images. As another example, the image processing system 100 may be configured to detect specific tissues or other materials in medical images.

While various embodiments of the invention have been described, it will be apparent to those of ordinary skill in the art that many more embodiments and implementations are possible within the scope of the invention. As one example, the render target may stay the same size during skin detection or localization (e.g., a 640×480 canvas onto which the GPU performs texture mapping), while the draw calls may specify smaller blocks within the render target. In other words, in other implementations, the render target itself need not be subdivided. Instead, the draw calls may specify portions of the render target for skin detection and localization texture processing. Accordingly, the invention is not to be restricted except in light of the attached claims and their equivalents.

We claim:

1. An image processing method comprising:
   obtaining a probability table comprising:
      a color coordinate index defining multiple color locations in the probability table; and
      a skin probability stored at the color locations;
   uploading the probability table from a system memory as a probability texture to a texture memory of a graphics processing unit, wherein the probability texture is stored as a first texture in the texture memory of the graphics processing unit;
   uploading a source image from the system memory as an image texture to the texture memory of the graphics processing unit, wherein the image texture is stored as a second texture in the texture memory of the graphics processing unit;
   issuing an occlusion query from a processor to the graphics processing unit to request a skin pixel count resulting from a draw call;
   issuing the draw call to the graphics processing unit to initiate a texture mapping of the probability texture onto a render target based on the image texture; and
   receiving an occlusion result from the graphics processing unit comprising the skin pixel count resulting from the draw call.

2. The image processing method of claim 1, further comprising:
   reporting whether skin exists in the image based on the skin pixel count.

3. The image processing method according to claim 1, further comprising establishing a skin threshold in the graphics processing unit for determining when a processed pixel output from the texture mapping qualifies as a skin pixel.

4. The image processing method according to claim 3, where establishing the skin threshold comprises:
   establishing an alpha test in the graphics processing unit.

5. The image processing method according to claim 1, further comprising:
   programming a pixel shader in the graphics processing unit to texture map the probability texture onto the render target based on the image texture.

6. The image processing method according to claim 5, where programming comprises:
   implementing a color space conversion from a source image color space in which the source image exists to a probability color space of the color coordinate index.

7. The image processing method according to claim 6, where programming further comprises:
   implementing an index operation of the color space conversion into the probability texture.

8. The image processing method according to claim 5, where programming comprises:
   implementing a color space conversion from a Red-Green-Blue color space in which the source image exists to a Cb-Cr color space of the color coordinate index.

9. An image processing system comprising:
   a system processor;
   a graphics processing unit coupled to the system processor, the graphics processing unit comprising: a texture memory; and multiple parallel pixel shaders coupled to the texture memory;
   a system memory coupled to the system processor, the system memory comprising:
      a probability table comprising: a color coordinate index defining multiple color locations in the probability table; and a skin probability stored at the color locations;
      a source image in which to detect skin; and
      a skin detection program comprising instructions which, when executed by the system processor, cause the image processing system to:
         upload the probability table as a probability texture from a system memory to the texture memory of the graphics processing unit, wherein the probability texture is stored as a first texture in the texture memory of the graphics processing unit;
         upload the source image as an image texture from the system memory to the texture memory of the graphics processing unit, wherein the image texture is stored as a second texture in the texture memory of the graphics processing unit;
         issue an occlusion query to the graphics processing unit to request a skin pixel count resulting from a draw call;
         define a render target with respect to the source image;
         issue the draw call from the system processor to the graphics processing unit to initiate a texture mapping by the pixel shaders of the probability texture onto the render target based on the image texture; and
         receive an occlusion result from the graphics processing unit comprising the skin pixel count resulting from the draw call.

10. The image processing system of claim 9, where the skin detection program further comprises instructions which, when executed by the system processor, cause the image processing system to:
    establish an alpha test in the graphics processing unit for determining when a processed pixel output from the texture mapping qualifies as a skin pixel.

11. The image processing system of claim 9, where the render target is a rectangle located in the source image.

12. The image processing system of claim 11, where the skin detection program further comprises instructions which, when executed by the system processor, cause the image processing system to iterate the following:
    determine a new render target location with respect to the source image;
    establish a new render target at the new render target location; and
    issue a draw call to the graphics processing unit to initiate a texture mapping by the pixel shaders of the probability texture onto the new render target based on the image texture.

13. The image processing system of claim 10, where the skin detection program further comprises instructions which, when executed by the system processor, cause the image processing system to program the pixel shaders in the graphics processing unit to:
    implement a color space conversion from a source image color space in which the source image exists to a probability color space of the color coordinate index; and
    implement an index operation of the color space conversion into the probability texture to determine the processed pixel output.

14. The image processing system of claim 13, where the color space conversion comprises a conversion from Red-Green-Blue to Cb-Cr.

15. The image processing method of claim 1, further comprising determining a render target location with respect to the source image.

16. The image processing method of claim 1, further comprising determining a render target size with respect to the source image.

17. The image processing method of claim 3, where the graphics processing unit determines a transparency value for each pixel of the processed pixel output.

18. The image processing system of claim 12, where the skin detection program further comprises instructions which, when executed by the system processor, cause the image processing system to iteratively determine a new render target size for the new render target location.

19. The image processing system of claim 10, where the skin detection program further comprises instructions which, when executed by the system processor, cause the image processing system to program the pixel shaders in the graphics processing unit to determine a transparency value for each pixel of the processed pixel output.

20. The image processing system of claim 10, where the skin detection program further comprises instructions which, when executed by the system processor, cause the image processing system to store a render target location when the processed pixel output qualifies as a skin pixel.

21. The image processing system of claim 12, where the new render target is a smaller size than the render target.

22. The image processing method of claim 1, wherein said draw call is a predicated draw call.

* * * * *